Oct. 31, 1939.  R. E. BURK ET AL  2,178,447
LAMINATED STRUCTURAL MATERIALS
Filed Jan. 11, 1936
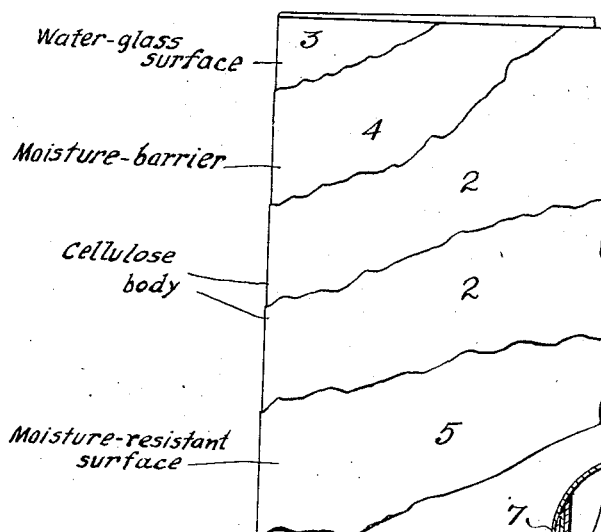
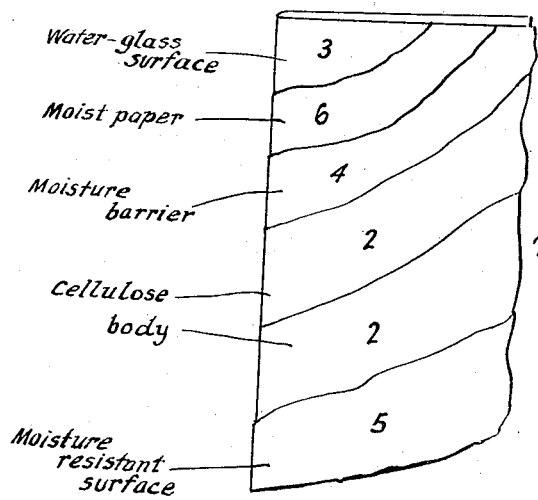
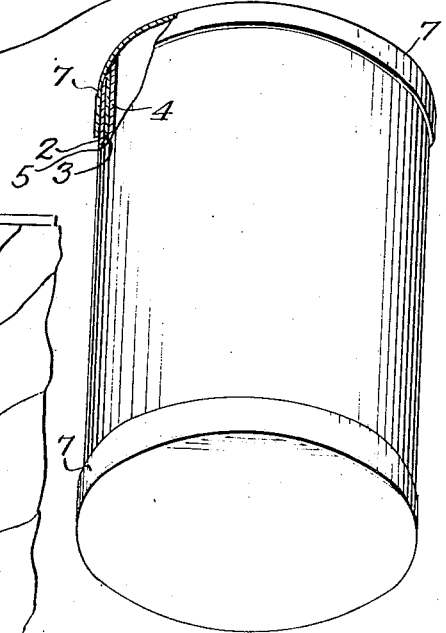
INVENTOR.
Robert E. Burk and
Everett C. Hughes
BY
ATTORNEYS.

Patented Oct. 31, 1939

2,178,447

UNITED STATES PATENT OFFICE 2,178,447

LAMINATED STRUCTURAL MATERIALS

Robert E. Burk and Everett C. Hughes, Cleveland, Ohio, assignors to The Standard Oil Company, Cleveland, Ohio, a corporation of Ohio Application January 11, 1936, Serial No. 58,760

5 Claims. (Cl. 229—3.5)

In the production of laminated materials including sheet cellulose, for oil and grease-resistant purposes, such as for containers of oils, etc., in contrast to combinations of lacquer-like oil-resistant facing layers, it has been found that a properly modified sodium silicate, moisture-containing, is an outstanding facing layer in a successful oil-resistant laminated structure including cellulose layers. However, extended experience with structures so made, shows that while very durable in moist cool climates, if subjected to storage conditions in hot dry climates, such structural material cracks, allowing the oil to enter the walls of the can. We have now found that this is caused by the cellulose body robbing moisture from the sodium silicate layer oil-barrier facing, and with a resultant deterioration of the latter such that oil gradually works through into the cellulose layer next. In accordance with the present invention however, this difficulty can now be overcome, and cellulosic layer structures capable of resisting oils and greases can be successfully made for climatic conditions including extreme heat and dryness.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative however, of but a few of the various ways in which the principle of the invention may be employed.

In said annexed drawing:

Figs. 1 and 2 are fragmentary perspective views partly in section illustrating embodiments of the invention; and Fig. 3 is a perspective view of a completed container, with heads on, partly broken away at the upper left corner.

The laminated structure in accordance with the invention is built up of such layers of sheet cellulose as may be desired in view of thickness and strength requirements to be encountered, and for instance such cellulose sheet material as chip board, chestnut board, etc., can be very advantageously employed in the present connection. An oil-resistant facing layer of water glass is applied to the cellulose, and we particularly also include means inhibiting robbing of moisture from the water glass by the cellulose. In the absence of such an element in the combination, the cellulose progressively withdraws moisture from the water glass layer, and where the latter is under oil, as in oil-container usage, the deterioration would be such in a hot climate that the oil would then work through. As means inhibiting the robbing of moisture from the water glass facing, we apply a moisture-resistant barrier between the cellulose body and the water glass layer, or in some instances specially saturate the cellulose body layer with moisture to the point of equilibrium such as to prevent robbing of the moisture from the water glass layer, or provide a saturated or saturatable thin paper layer for this purpose. These may be embodied together. The moisture-resistant barrier may be for instance of asphaltic character, or water-proof casein, rubber, etc. As illustrated in the drawing, the structure comprises two or more layers of sheet cellulose 2, which may be of more or less refined character as desired, ordinarily a cheap stock such as chip board, chestnut board, etc. being sufficient. A surface oil-resistant layer 3 constitutes the exposed face, which in the case where made up into oil containers is the inside, and interposed between the cellulose body 2 and the water glass facing 3 is a moisture-resistant barrier 4. Desirably also, a facing layer 5 moisture-resistant, may complete the facing of the cellulose on the other side. Additionally if desired, next to the water glass inside a thin paper layer 6 (see Fig. 2) may be provided which is saturated or saturatable with moisture and thereby assists in the preservation of the water glass layer. The moisture-barrier 4 may be a layer of asphalt, rubber, waterproof casein, etc., or a layer of paper especially impregnated with such material. The outer facing 5 where employed, may be asphaltic, or where preferred, wax or like moisture-resistant material, such as carnauba wax, particularly with a softening ingredient, may be employed. The oil-resistant layer 3 is of water glass, for instance sodium silicate, including gum arabic and glycerol, and desirable also a non-crystallizing sugar or dextrine. Advantageously also, a soap, as for instance potassium oleate or a sodium soap of oleic and other fatty acids yielding a liquid soap is included in small amount. Thus for instance, with a sodium silicate proportion of 65–80 per cent (illustratively analyzing 1 part of $Na_2O$ to 3.25 parts of $SiO_2$) there may be incorporated 18–33 per cent of glycerol, 0.5–1.1 per cent of gum arabic, 0.35–1.5 per cent of dextrine, and 0.05–0.1 per cent of liquid soap. Where the cellulose body is to be moisture-saturated or fiber-saturated to equilibrium with the water glass layer, this is accomplished by subjecting the cellulose to an atmosphere of steam, whereby saturating the cellulose at a temperature of about 115–120° F. with water vapor before the water glass is applied. The moisture-barrier layer 5 is applied, as for instance after the facing layer 3 has been set by drying at atmospheric temperature or higher temperature up to 130° F. for instance. By laying the cellulose body layers in the form of a hollow container or tube which may be cut up into container lengths, and applying the facing layers successively, convenient forms of structure may be had for usage as containers, and the ends thereof with their layers can be closed by heads 7 of sheet metal or similar cellulosic material as employed in the wall, the edge being secured by crimping or like fastening.

Other modes of applying the principle of the invention may be employed, change being made as regards the details described, provided the features stated in any of the following claims, or the equivalent of such, be employed.

We therefore particularly point out and distinctly claim as our invention:

1. A laminated structure, comprising a container having a cellulose body layer, and an oil-resistant exposed inner layer of water glass, said cellulose body being moisture-saturated and a moisture resistant barrier exterior of the moist cellulose body layer to prevent loss of moisture.

2. A laminated container for oily materials, comprising an inner exposed oil-resistant layer of water glass, a layer of thin water-absorbent paper externally thereof, a water-proof layer externally of said water-absorbent paper, and then cellulose body layers.

3. A laminated container for oily materials, comprising an inner exposed oil-resistant layer of water glass, a layer of thin damp paper externally thereof, a water-proof layer externally of said damp paper, and then cellulose body layers.

4. A laminated structure, comprising a cellulose body layer, an oil-resistant exposed layer of water glass, said cellulose body layer being saturated with moisture to prevent robbing the moisture-containing water glass, and a surface layer on the other face of said cellulose body for preventing loss in moisture.

5. A laminated structure for a container, consisting of a tubular cellulose wall, an interior oil-resistant facing of water glass, a moisture-bearing paper layer adjacent the water-glass and a moisture-barrier layer interposed between said paper layer and said cellulose wall, and means closing the ends of all said layers.

ROBERT E. BURK.
EVERETT C. HUGHES.